United States Patent
Schreiber et al.

(10) Patent No.: US 12,416,477 B2
(45) Date of Patent: Sep. 16, 2025

(54) MICRO GAS GENERATOR AND METHOD FOR PRODUCING A MICRO GAS GENERATOR

(71) Applicant: ZF AUTOMOTIVE GERMANY GMBH, Alfdorf (DE)

(72) Inventors: Simon Schreiber, Mutlangen (DE); Daniel Böck-Kauer, Elchingen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 10 days.

(21) Appl. No.: 18/562,849

(22) PCT Filed: May 23, 2022

(86) PCT No.: PCT/EP2022/063844
§ 371 (c)(1),
(2) Date: Nov. 21, 2023

(87) PCT Pub. No.: WO2022/248382
PCT Pub. Date: Dec. 1, 2022

(65) Prior Publication Data
US 2024/0210149 A1    Jun. 27, 2024

(30) Foreign Application Priority Data
May 26, 2021    (DE) ..................... 10 2021 113 570.2

(51) Int. Cl.
F42B 3/04    (2006.01)
F42B 3/103    (2006.01)
(52) U.S. Cl.
CPC ............... *F42B 3/04* (2013.01); *F42B 3/103* (2013.01)

(58) Field of Classification Search
USPC .................................. 102/530; 280/736, 741
See application file for complete search history.

(56) References Cited

U.S. PATENT DOCUMENTS

| | | | |
|---|---|---|---|
| 5,558,366 A * | 9/1996 | Fogle, Jr. ............ | B60R 21/2644 D15/15 |
| 8,172,262 B2 * | 5/2012 | Mayville ............. | B60R 21/2644 280/736 |

(Continued)

FOREIGN PATENT DOCUMENTS

| DE | 69925403 T2 | 2/2006 |
|---|---|---|
| DE | 202013104757 U1 | 1/2014 |

(Continued)

OTHER PUBLICATIONS

International Search Report for corresponding International Application No. PCT/EP2022/063844, date of mailing Sep. 6, 2022, pp. 1-6.

*Primary Examiner* — Reginald S Tillman, Jr.
(74) *Attorney, Agent, or Firm* — Tarolli, Sundheim, Covell & Tummino LLP (57) ABSTRACT

The invention describes a micro gas generator (10) for a vehicle safety system comprising a plastic housing part (20) and a metallic insert (22), wherein the plastic material forming the housing part (20) is injection-molded around the insert (22) and, thus, the latter is positively connected to the housing part (20), and wherein a seat (24) in which an igniter (14) is inserted is formed in the housing part (20). In addition, a method of manufacturing a micro gas generator (10) is described.

14 Claims, 5 Drawing Sheets

(56) References Cited

U.S. PATENT DOCUMENTS

| | | | |
|---|---|---|---|
| 9,879,952 B2* | 1/2018 | Schwuchow | F42B 3/26 |
| 2005/0006887 A1 | 1/2005 | Barker et al. | |
| 2007/0096451 A1* | 5/2007 | Stevens | B60R 21/2644 |
| | | | 60/632 |
| 2013/0068123 A1 | 3/2013 | Lefevre et al. | |
| 2013/0276664 A1* | 10/2013 | Ohsugi | C06D 5/00 |
| | | | 102/530 |
| 2016/0052481 A1 | 2/2016 | Yamauchi et al. | |

FOREIGN PATENT DOCUMENTS

| | | |
|---|---|---|
| DE | 102013020526 A1 | 6/2015 |
| DE | 102014116028 A1 | 5/2016 |
| DE | 112015005576 T5 | 9/2017 |
| DE | 102017109208 A1 | 10/2018 |
| DE | 102017124292 A1 | 4/2019 |
| WO | 2010037516 A2 | 4/2010 |

\* cited by examiner

MICRO GAS GENERATOR AND METHOD FOR PRODUCING A MICRO GAS GENERATOR

RELATED APPLICATIONS

This application is a U.S. National Stage Application filed under 35 USC 371 claiming priority to Serial No. PCT/EP2022/063844, filed on 23 May 2022; which claims priority from German Patent Application DE 10 2021 113 570.2, filed 26 May 2021, the entireties of which are hereby incorporated herein by reference.

TECHNICAL FIELD

The invention relates to a micro gas generator for a vehicle safety system and a method of manufacturing a micro gas generator of this type.

BACKGROUND

In vehicle safety systems, micro gas generators serve for triggering quick events, for example in belt tensioners, airbags, hood props etc.

Due to the necessary short reaction times of few milliseconds, micro gas generators are usually operated pyrotechnically. Accordingly, gases formed during quick combustion are used to reach a very fast movement, e.g., of a piston or a fabric, or the break-up of a membrane by the resulting pressure.

For triggering a pyrotechnical unit, an igniter which is usually ignited with a defined electric pulse is required. The pressure generated by an igniter is frequently boosted by means of propelling charges.

Consequently, the igniter must be accommodated in a holder which resists the prevailing pressures.

There are known machined metallic holders which are very cost-intensive, however, due to the involved plug interface. In addition, it is known to injection-mold plastic material around the igniter when manufacturing the micro gas generator, the plastic material simultaneously forming a plug interface for connection to the vehicle wire harness and an igniter support. It is a drawback here that the handling of pyrotechnical igniters requires complex protective measures, which has an aggravating effect on the process of injection-molding around the igniter. In particular technically more sophisticated injection-molding processes with a plug interface by the manufacturer require, apart from an expertise in fabrication methods, further knowledge for the handling and the processing of pyrotechnical elements.

SUMMARY

Therefore, it is an object of the present invention to facilitate the manufacture of a micro gas generator.

According to the invention, this object is achieved by a micro gas generator for a vehicle safety system comprising a plastic housing part and a metallic insert, wherein the plastic material forming the housing part is injection-molded around the insert and, thus, the insert is positively connected to the housing part, and wherein a seat in which an igniter is inserted is configured in the housing part.

A micro gas generator of this type offers the advantage that the fabrication of the plastic housing part and the fabrication of the igniter can be carried out completely separately from each other. In this way, the manufacture of the housing part is considerably facilitated as during injection-molding of the plastic housing part no protective measures due to the igniter have to be taken. This has a beneficial effect on the manufacturing costs of the housing part and, thus, on the total manufacturing costs of the micro gas generator.

The plastic housing part along with the metallic insert forms a support of the micro gas generator, the metallic insert improving the mechanical stability of the support. In addition, the metallic insert can serve for fastening the micro gas generator.

The metallic insert preferably cannot be detached non-destructively from the plastic housing part.

According to the invention, the igniter is inserted into the support, specifically into the plastic housing part, only after the support is completed.

Preferably, the seat is configured so that, after being inserted, the igniter is held frictionally in the seat.

According to one embodiment, plastic material can also be injection-molded partially around the igniter. More precisely, a portion of an ignition head of the igniter as well as an area of the electrical contacts of the igniter adjacent to the ignition head can be injection-molded. In this way, the electrical contacts are stabilized which is of advantage during handling and during assembly of the igniter. In particular, the stabilization of the electrical contacts reduces the risk of the contacts being bent.

The seat for the ignition is preferably formed at least partly by a hollow-cylindrical portion of the housing part. Such a seat can be manufactured in a particularly simple manner.

According to one embodiment, a fixing cap is attached to the hollow-cylindrical portion in which the igniter is received, or a fixing cap is inserted into the hollow-cylindrical portion. The fixing cap retains the igniter tightly on the housing part and prevents the igniter from detaching from the housing part when the micro gas generator is triggered.

In order to obtain a sufficiently stable connection between the fixing cap and the housing part, the fixing cap is locked, glued and/or welded to the housing part.

At a bottom of the fixing cap there is formed, for example, an elevation, specifically an annular elevation, which biases the igniter against the housing part. In this way, better sealing of the micro gas generator can be achieved.

By means of the elevation, the fixing cap presses preferably only onto rigid areas on the igniter so that the igniter is prevented from being damaged. In particular, the fixing cap presses onto an edge area of the igniter by means of the elevation.

If plastic material is injection-molded around the igniter, the igniter can be connected to the housing part by welding, locking and/or gluing the plastic material injection-molded to the igniter to the housing part. The fixing cap is not required in this case.

According to one embodiment, a propelling charge container is attached to the housing part, the propelling charge container being configured such that the igniter is fixed in the seat by the propelling charge container. The use of a propelling charge container offers the advantage that the constant distance between the igniter and the propelling charge and, thus, the pressure generated by the igniter can be reproducibly increased by igniting the propelling charge. As the igniter is fixed in the seat by the propelling charge container, no separate fixing cap is required to fix the igniter.

For example, the propelling charge container is held on the housing part by means of a locking connection. A locking connection enables particularly quick and simple assembly of the propelling charge container.

As an alternative or in addition, the propelling charge container may be integrally connected to the housing part and specifically welded to the housing part. An integral connection helps obtain an excellent sealing and a particularly tight connection between the housing part and the propelling charge container.

The igniter includes specifically an ignition head, wherein at an end face of the ignition head a collar projecting in the axial direction toward the housing part is formed and an annular seat for the collar is provided for in the housing part. The annular seat is formed as a negative form of the collar, for example. This offers the advantage that, when the igniter is inserted, a labyrinth effect occurs, causing the sealing of the micro gas generator to be improved.

The collar preferably extends along an outer edge of the ignition head.

According to one embodiment, the seat for the collar of the ignition head is partly formed by an annular projection extending in the axial direction toward the igniter base which is adjacent specifically to an inner face of the collar of the ignition head. When the ignition head is inserted into the seat and is pressed against the projection in the axial direction, a sealing surface is formed at the contact point. The sealing is additionally improved by the annular projection abutting on an inner face of the collar of the ignition head.

The projection can taper toward the ignition head, thereby the flexibility of the projection being improved.

According to one embodiment, a stop is provided which delimits an insertion depth of the igniter. In this way, the igniter can be positioned particularly easily in a defined position in the housing part.

Optionally, a sealing, and specifically an O-ring, is interposed between the igniter and the housing part. This improves additionally the sealing of the micro gas generator.

The metallic insert is a disk projecting radially from the housing part, for example. The metallic insert can be connected and/or enclosed by an integral connection to a corresponding counter-surface of a vehicle safety structure, can be fastened to or bear against said structure.

The metallic insert particularly is a punched metal disk.

The object is further achieved, according to the invention, by a method for manufacturing a micro gas generator, wherein a metallic insert is placed into a tool mold and a plastic housing part is manufactured in the tool mold by injection-molding. The metallic insert is overmolded so that it is positively connected to the housing part. The plastic housing part includes a seat for an igniter, wherein an igniter is inserted into the seat after injection-molding.

BRIEF DESCRIPTION OF THE DRAWINGS

Further advantages and features of the invention will be evident from the following description and from the attached drawings which are referred to, and wherein.

DESCRIPTION

Figure 1:
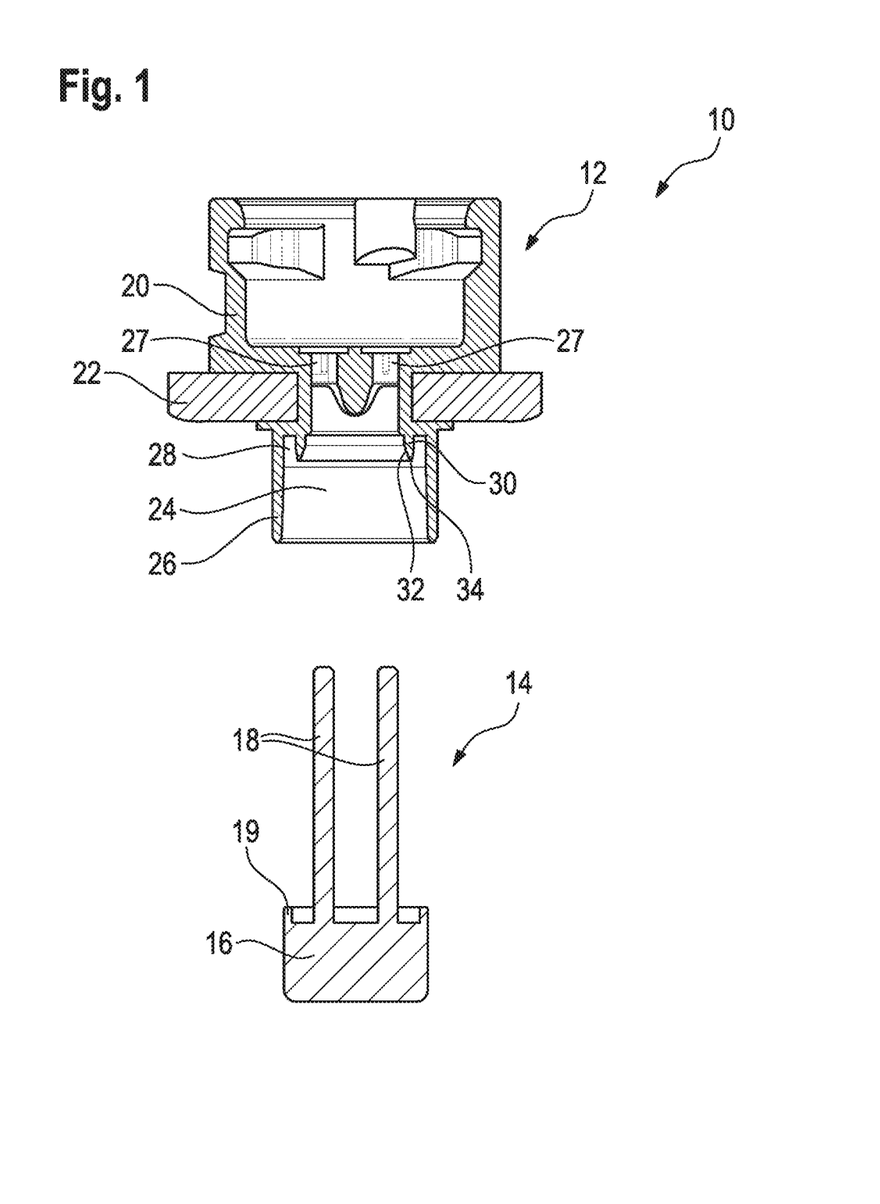
FIG. 1 shows a support and an igniter of a micro gas generator according to the invention.

FIG. 1 illustrates parts of a micro gas generator 10. In particular, a support 12 and an igniter 14 of the micro gas generator 10 are shown, the support 12 and the igniter 14 being provided separately from each other.

The igniter 14 includes an ignition head 16 and electrical contacts in the form of pins 18.

A collar 19 extending in the axial direction is integrally formed on an end face of the ignition head 16.

The support 12 is formed by a plastic housing part 20 and a metallic insert 22, wherein the plastic material forming the housing part 20 is injection-molded around the insert 22 and, thus, the latter is positively connected to the housing part 20. In particular, the metallic insert 22 is overmolded in such a way that it cannot be detached non-destructively from the housing part 20.

The metallic insert 22 is a disk projecting radially from the housing part 20.

In the housing part 20, a seat 24 is formed into which the igniter 14 can be inserted. On the pin side, a shaping of the plastic material is suitable for locking a plug for connection to the vehicle wire harness.

The seat 24 for the igniter 14 is formed at least partly by a hollow-cylindrical portion 26. In the hollow-cylindrical portion 26 the ignition head 16 can be received.

Moreover, the seat 24 includes two recesses 27 in which the pins 18 of the igniter 14 can be received.

The pins 18 extend, in the inserted state of the igniter 14 (see FIG. 2), through the support 12, more precisely through the recesses 27, and are accessible from one side of the support 12 for electrical contacting of the igniter 14.

In addition, an annular seat 28 for the collar 19 of the igniter 14 is formed in the housing part 20.

The annular seat 28 in the illustrated embodiment is formed by an annular projection 30 being provided which extends coaxially with a wall of the hollow-cylindrical portion 26 within the portion 26.

The annular projection 30 is tapered toward its free end. Accordingly, the taper 32 can extend over the whole length of the projection 30 or, as shown in the Figures, merely over a portion of the projection 30 which is adjacent to the free end of the projection 30. As the taper 32 extends only over a part of the projection 30, the projection 30 has a stabler design.

The annular projection 30 at the same time forms a stop 34 delimiting an insertion depth of the igniter 14. More precisely, the stop 34 is formed by the free end of the projection 30.

The stop 34 can also be formed at a different position of the seat 24, however, such as by the bottom of the annular seat 28. In the illustrated embodiment, there is provided an axial distance between the bottom of the annular seat 28 and the collar 19 of the igniter 14, however, so that a gasket (see FIG. 3) can be inserted between the igniter 14 and the housing part 20.

Figure 2:
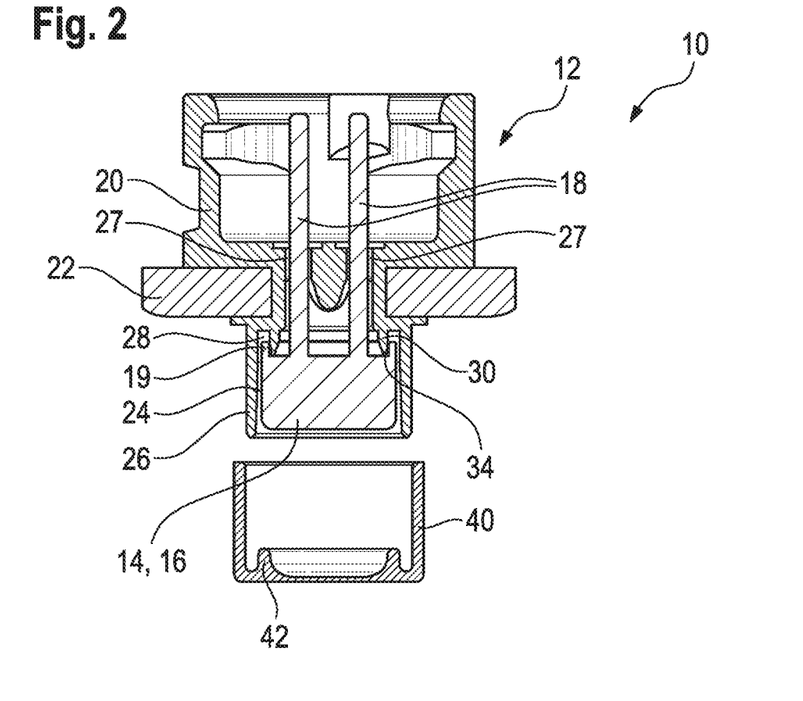
FIG. 2 shows parts of a micro gas generator according to the invention.

FIG. 2 illustrates the parts of the micro gas generator 10 of FIG. 1, the igniter 14 being mounted on the support 12, specifically on the housing part 20.

The igniter 14 is held frictionally in the seat 24. In particular, the ignition head 16 is in contact with an inner wall of the hollow-cylindrical portion 26, thereby obtaining, in addition to a friction force, also a sealing of the micro gas generator 10.

When the igniter 14 is inserted in the housing part 20, as shown in FIG. 2, the ignition head 16 abuts against the stop 34.

The collar 19 of the igniter 14 is provided in the annular seat 28, wherein the projection 30 may abut on an inner face of the collar 19. In this way, a labyrinth effect occurs which ensures improved sealing of the micro gas generator 10.

In FIG. 2, additionally a fixing cap 40 is illustrated which can be arranged on the hollow-cylindrical portion 26, more precisely can be attached to the latter so as to hold the igniter 14 tightly on the housing part 20.

Figure 4:
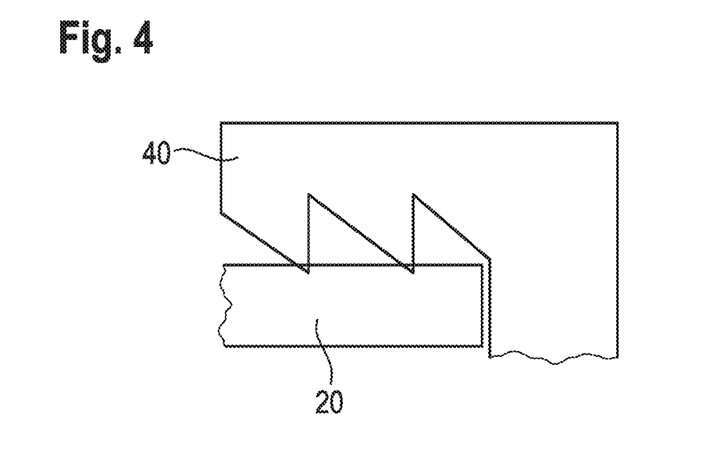
FIG. 4 shows a detail view in the area of the fixing cap.

For this purpose, connectors may be provided, such as locking elements by means of which the fixing cap 40 can be retained on the housing part 20. As an alternative, a bayonet lock or a thread may be provided. As another alternative, on an inner face of the fixing cap 40 teeth may be formed, specifically a so-called fir-tree structure, the teeth being crimped when the fixing cap 40 is attached to the hollow-cylindrical portion 26. In this way, a holding and sealing function is achieved. Such a fir-tree structure is schematically shown in FIG. 4 which illustrates a detail view in the area of a contact surface of the fixing cap 40 with the hollow-cylindrical portion 26 of the housing part 20. The other connectors are not shown in the Figures for convenience.

As an alternative or in addition, the fixing cap 40 can be welded to the housing part 20. The welding can be performed by laser welding, vibration welding etc., for example.

An elevation 42 is formed at a bottom of the fixing cap 40.

The elevation 42 is annular when viewed in a top view onto the bottom of the fixing cap 40.

The elevation 42 serves for biasing the igniter 14 against the housing part 20 when the fixing cap 40 is attached to the housing part 20. This, too, serves for better sealing of the micro gas generator 10.

Inside the elevation 42, the fixing cap 40 has an area of a small wall thickness. The wall thickness and the geometry are selected particularly so that the fixing cap 40 can tear in a defined manner when the micro gas generator 10 is triggered so that gas can escape from the micro gas generator 10.

Figure 3:
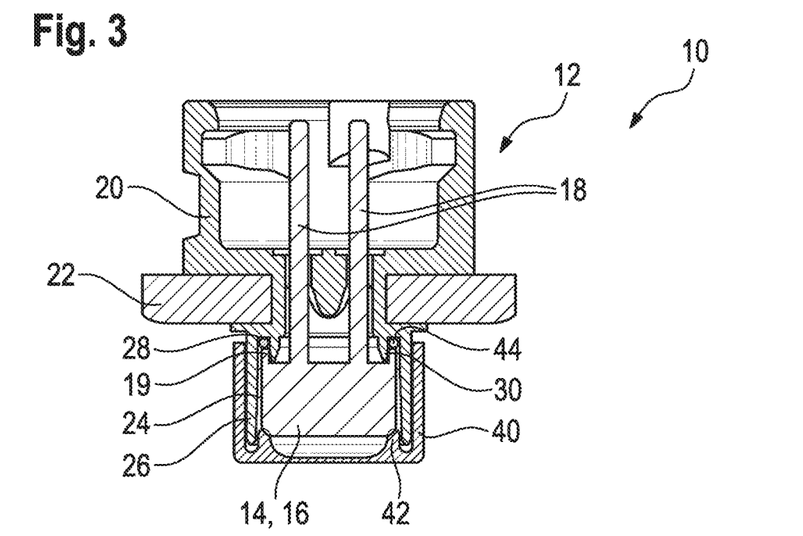
FIG. 3 shows the partial assembly of a micro gas generator according to the invention.

FIG. 3 illustrates a micro gas generator 10 in an assembled state with the fixing cap 40 being attached.

In addition, in FIG. 3 a gasket 44 in the form of an O-ring is shown. The gasket 44 is disposed in the annular seat 28 and is compressed by the collar 19 of the igniter 14 when the latter is disposed in the seat 24.

Figure 5:
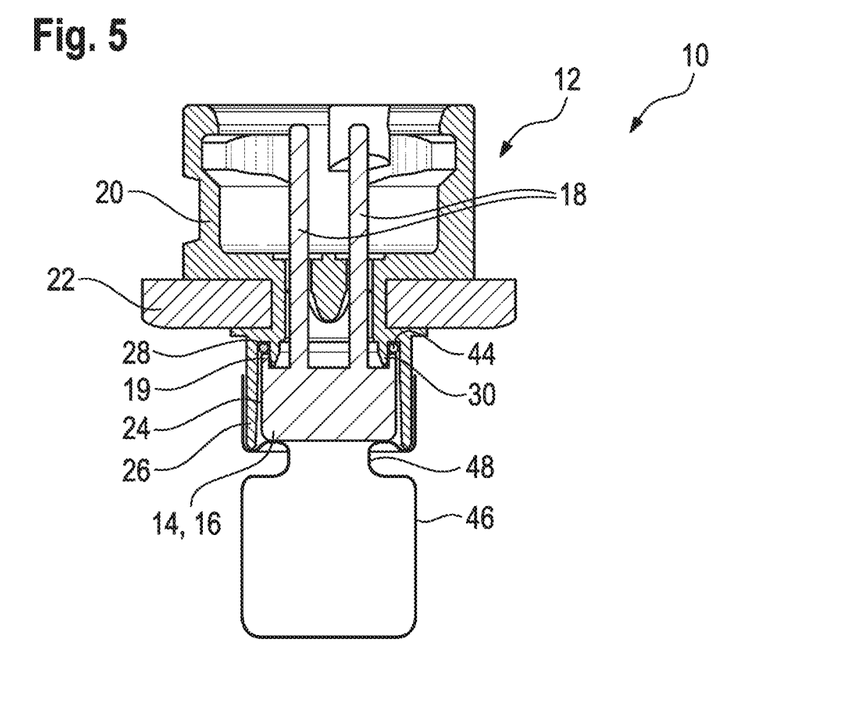
FIG. 5 shows a micro gas generator according to the invention as set forth in a further embodiment.

As is schematically illustrated in FIG. 5, a propelling charge container 46 can be provided. A propelling charge can increase the pressure formed by the ignition.

The propelling charge container 46 can simultaneously serve for fixing the igniter 14. For this purpose, the propelling charge container 46 can have a radially inwardly protruding structure 48 which biases the igniter 14 against the housing part 20.

The propelling charge container 46 can be connected, similar to the fixing cap 40, to the housing part 20 by means of a locking connection, a bayonet lock, welding or in a different way.

In an alternative embodiment, a propelling charge can be arranged on the ignition head 16.

Figure 6:
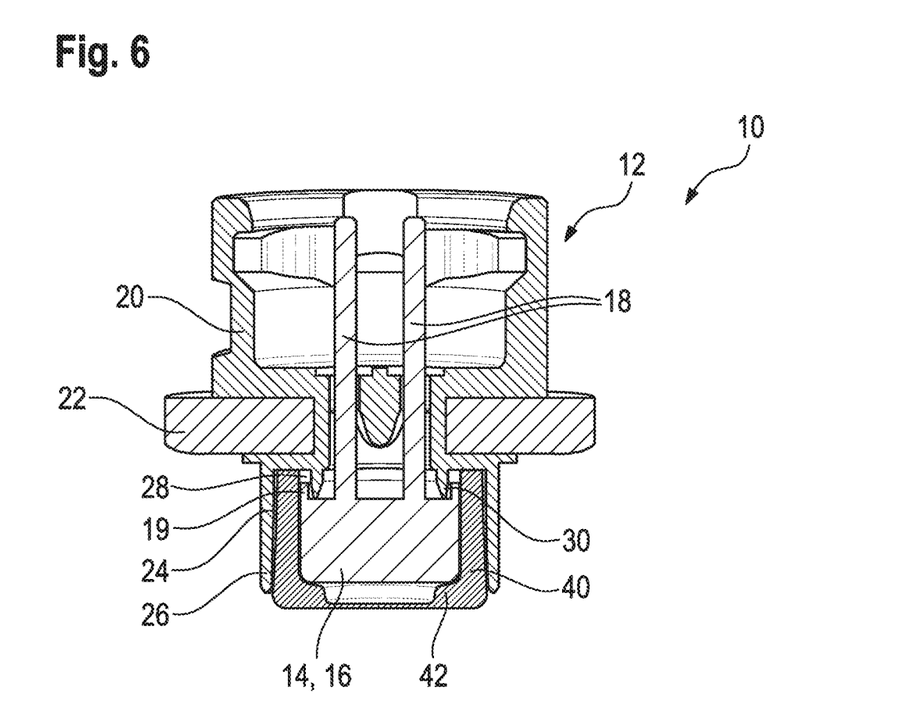
FIG. 6 shows another micro gas generator according to the invention.

FIG. 6 shows another embodiment of a micro gas generator 10.

The micro gas generator 10 shown in FIG. 6 differs from the micro gas generator 10 illustrated in FIGS. 1 to 3 in that the fixing cap 40 is not attached to, but is inserted into the hollow-cylindrical portion 26. That is, the fixing cap 40 is attached to the ignition head 16.

Figure 7:
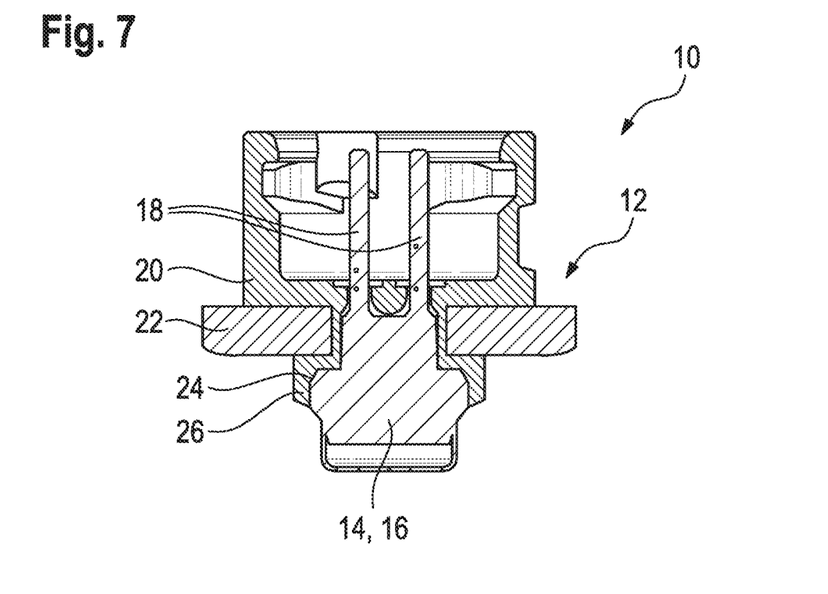
FIG. 7 shows yet another micro gas generator according to the invention.

FIG. 7 illustrates another embodiment of a micro gas generator 10.

The micro gas generator 10 illustrated in FIG. 7 differs from the above-described micro gas generators 10 substantially by the shape of the igniter 14 and a seat 24 in the housing part 20 which is appropriately adapted to the shape of the igniter 14.

Figure 8:
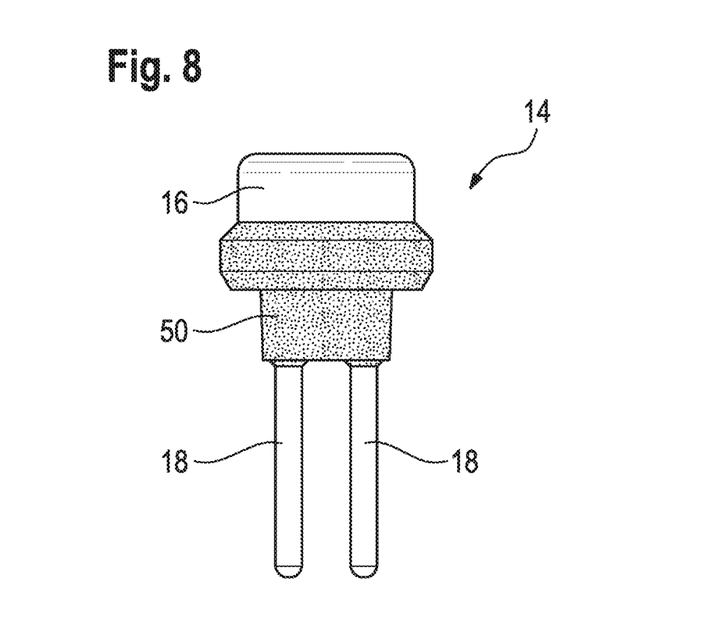
FIG. 8 shows the igniter of the micro gas generator of FIG. 7.

The igniter 14 of the micro gas generator 10 is shown in FIG. 8.

The igniter 14 is provided with a plastic overmolding 50. In particular, plastic material is injection-molded around a portion of the ignition head 16 as well as around the pins 18 in a portion adjacent to the ignition head 16.

The plastic overmolding 50, on the one hand, serves to stabilize the pins 18 so as to prevent the pins 18 from being bent during handling or assembly.

Furthermore, the plastic overmolding 50, particularly the portion of the plastic overmolding 50 disposed on the ignition head 16, serves for fastening the igniter 14 to the housing part 20.

For example, the plastic overmolding 50 is integrally connected to the housing part 20. This can be done, as already above-described in conjunction with the fastening of the fixing cap 40 to the housing part 20, by welding, specifically by laser welding, vibration welding etc.

An integral connection of the plastic overmolding 50 to the housing part 20 is preferably made along the hollow-cylindrical portion 26.

As an alternative or in addition, locking elements which engage in a corresponding seat on the housing part 20 can be provided on the plastic overmolding 50. For convenience, they are not illustrated in FIGS. 7 and 8.

The invention claimed is:

1. A micro gas generator (10) for a vehicle safety system comprising a plastic housing part (20) and a metallic insert (22), wherein the plastic material forming the housing part (20) is injection-molded around the insert (22) so that the insert is positively connected to the housing part (20), and wherein a seat (24) in which an igniter (14) is inserted is formed in the housing part (20), the igniter (14) having an ignition head (16), wherein a collar (19) projecting in the axial direction toward the housing part (20) is formed on an end face of the ignition head (16) and an annular seat (28) for the collar (19) is formed in the housing part (20), the seat (28) for the collar (19) of the ignition head (16) being partly formed by an annular projection (30) extending in the axial direction toward the ignition head (16) which projection specifically abuts on an inner face of the collar (19) of the ignition head (16).

2. The micro gas generator (10) according to claim 1, wherein the seat (24) for the igniter (14) is formed at least partly by a hollow-cylindrical portion (26) of the housing part (20).

3. The micro gas generator (10) according to claim 2, wherein a fixing cap (40) is attached to the hollow-cylindrical portion (26) in which the igniter (14) is received, or in that a fixing cap (40) is inserted in the hollow-cylindrical portion (26), the fixing cap retaining the igniter on the housing part.

4. The micro gas generator (10) according to claim 3, wherein an elevation (42), which biases the igniter (14) against the housing part (20), is formed on a bottom of the fixing cap (40).

5. The micro gas generator (10) according to claim 1, wherein a propelling charge container (46) is attached to the housing part (20), wherein the propelling charge container (46) is configured so that the igniter (14) is fixed in the seat (24) by the propelling charge container (46).

6. The micro gas generator (10) according to claim 1, wherein a stop is provided which delimits an insertion depth of the igniter (14).

7. The micro gas generator (10) according to claim 1, wherein a gasket (44) is interposed axially between the igniter (14) and the housing part (20).

8. The micro gas generator (10) according to claim 1, wherein the metallic insert (20) is a disk which projects radially from the housing part (20).

9. A method of manufacturing a micro gas generator (10) according to claim 1, comprising the steps of:
   placing the metallic insert in a tool mold,
   in the tool mold, the plastic housing part (20) is manufactured by injection-molding, wherein the metallic insert (22) is overmolded in such a way that it is positively connected to the housing part (20), and wherein the plastic housing part (20) includes the seat for the igniter,
   after injection-molding the igniter is inserted into the seat (24).

10. The micro gas generator (10) according to claim 4, wherein the elevation (42) is an annular elevation (42).

11. The micro gas generator (10) according to claim 7, wherein the gasket (44) is an O-ring.

12. A micro gas generator (10) for a vehicle safety system comprising a plastic housing part (20) and a metallic insert (22), wherein the plastic material forming the housing part (20) is injection-molded around the insert (22) so that the insert is positively connected to the housing part (20), and wherein a seat (24) in which an igniter (14) is inserted is formed in the housing part (20), the seat (24) for the igniter (14) being formed at least partly by a hollow-cylindrical portion (26) of the housing part (20), a fixing cap (40) being attached to the hollow-cylindrical portion (26) in which the igniter (14) is received, or being inserted in the hollow-cylindrical portion (26), wherein an elevation (42), which biases the igniter (14) against the housing part (20), is formed on a bottom of the fixing cap (40).

13. The micro gas generator (10) according to claim 12, wherein the elevation (42) is an annular elevation (42).

14. A micro gas generator (10) for a vehicle safety system comprising a plastic housing part (20) and a metallic insert (22), wherein the plastic material forming the housing part (20) is injection-molded around the insert (22) so that the insert is positively connected to the housing part (20), and wherein a seat (24) in which an igniter (14) is inserted is formed in the housing part (20), wherein a propelling charge container (46) is attached to the housing part (20), wherein the propelling charge container (46) is configured so that the igniter (14) is fixed in the seat (24) by the propelling charge container (46).

\* \* \* \* \*